Aug. 17, 1926.
J. A. HEANY
RESILIENT TIRE FOR VEHICLES
Filed August 8, 1919
1,596,731
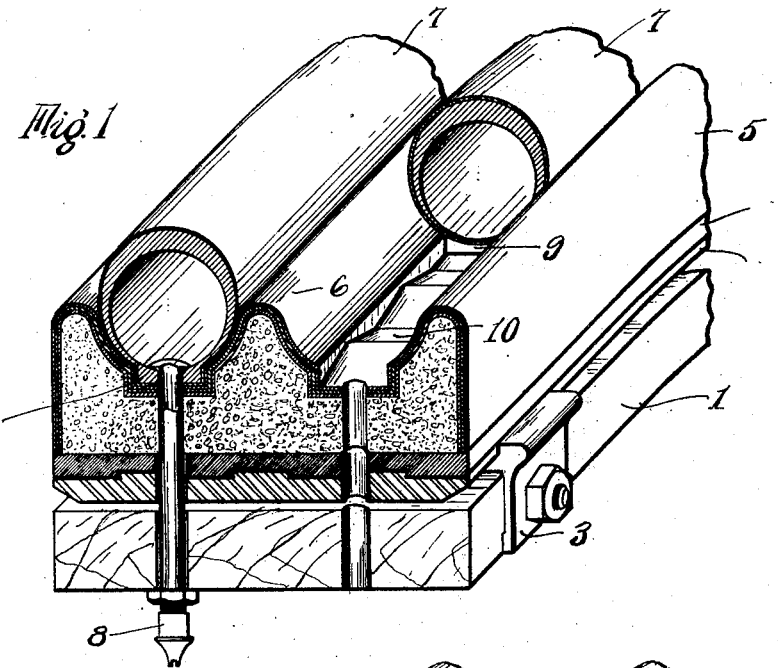
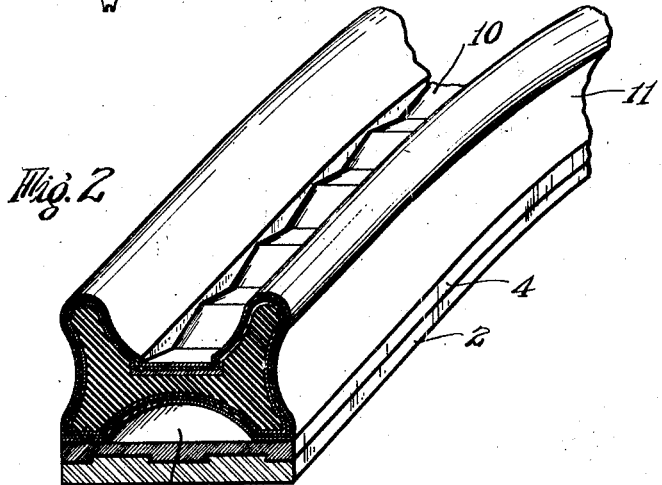
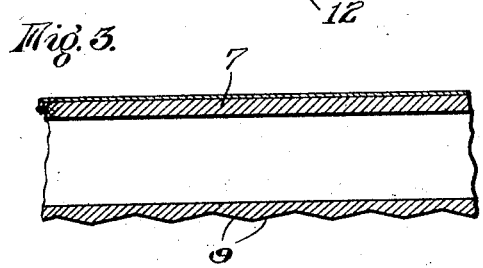
INVENTOR
JOHN ALLEN HEANY.
BY
Lewis O. Hutchins
ATTORNEY Patented Aug. 17, 1926.

1,596,731

UNITED STATES PATENT OFFICE.

JOHN ALLEN HEANY, OF NEW HAVEN, CONNECTICUT, ASSIGNOR TO HEANY LABORATORIES, INC., OF NEW HAVEN, CONNECTICUT, A CORPORATION OF CONNECTICUT.

RESILIENT TIRE FOR VEHICLES.

Application filed August 8, 1919. Serial No. 316,210.

This invention relates to tires for vehicles and is more particularly directed toward tires adapted for use on any type of automobiles, such as the passenger cars or commercial trucks. The object of the invention is to provide a tire which has a long life in use, which is simple in construction and is adapted for easy replacement or repairs, and also to provide a tire which may be used under conditions that would act to disable a tire of ordinary construction. A further object is to provide a tire construction which permits the use of pneumatic tires of diminished cross section without in any way lessening the resilient action of the complete tire.

I attain the above objects by the construction of a tire having an inner resilient member or inner tire combined with one or more pneumatic tires mounted on the outer side of the inner tire and adapted to bear against the surface over which the vehicle supported by the tire travels. The inner tire is attached to the rim or felloe of the wheel and is made of a suitable resilient substance such as spongy rubber, or solid rubber with or without air spaces in it. The outer pneumatic tires are preferably of the single-tube type although obviously inner tube tires may be utilized as well.

A specific embodiment of the invention is illustrated in the accompanying drawing in which—

Fig. 1 is a fragmentary perspective view of the rim of a wheel having the tire mounted upon it, Fig. 2 is a similar view of a modification of the inner tire, and Fig. 3 is a view showing the corrugations on the base of the pneumatic tire.

Referring now to the drawings, the reference character 1 indicates the felloe or rim of a wheel and 2 a detachable rim fastened onto the wheel by means of the clamps 3 in accordance with the present practice used on some types of solid tire wheels.

To the rim 2 is securely fastened the hard rubber portion 4 of the inner tire. These two parts may be fastened together in accordance with any approved practice but I have shown them dovetailed together. The inner tire 5 is fastened to the hard rubber portion 4, preferably by vulcanizing.

The inner tire 5 is provided with one or more circumferential grooves 6. I have shown the tire provided with two grooves providing for two pneumatic tires, but obviously the tire could be constructed with a different number of pneumatic tires in which case the solid tire 5 would be provided with a corresponding number of grooves. In each groove 6 is mounted a pneumatic tire 7, preferably of the single-tube type. Each tire 7 is provided with a valve 8 of any preferred construction and an aperture is provided in the solid tire and in the rim and felloe through which the stem of the valve is passed. Because of the resilient character of the inner tire the valve stem will obviously move relatively to the rim and felloe, under working conditions of the tire. Provision is made for such relative motion, as for example, by making the aperture in the rim large, so that the valve stem moves easily in it. The pneumatic tubes 7 are preferably made reinforced or thickened at their outer edges or wearing surfaces for obvious reasons, and their inner edges are provided with corrugated ribs 9 which are arranged to coact with recesses 10 in the bottom of the grooves 6 in the solid tire 5.

To assemble the tire, the inner tire being secured to the rim 2, the pneumatic tube 7, in a deflated condition, is slipped into place in its groove in the inner tire 5 with the valve stem passing through the aperture provided for it. The tube is then inflated, which makes it quite rigid and acts to clamp it securely to the solid tire. The ribs 9 coact with the corresponding grooves 10 provided for them in the inner tire 5 and effectually prevent the pneumatic tubes from turning in their grooves, and the ribs and grooves prevent slipping or creeping of the pneumatic tubes on the inner tire. To remove an outer tire it is merely necessary to deflate it, thus causing it to lose its rigidity, and when in such deflated condition it is slipped out of its groove.

The inner tire is formed of resilient rubber or the equivalent material and may be made with one air space in it or it may be made perforated with a large number of air spaces like a spongy rubber body, and the inner tire and the pneumatic tubes are suitably reinforced as with fabric or cord, especially at their contacting surfaces. In Fig. 2 is illustrated a modification of the inner tire, the rim being shown at 2, the hard rubber portion at 4, and the solid rubber inner tire at 11. The inner tire 11 is not made of spongy rubber but provision is made for additional resiliency of the inner tire by providing it with the air space or annular aperture 12. The inner tire shown in Fig. 2 is provided with a single groove having at its lowermost portion the corrugated groove 10 arranged to coact with a corrugated rib on a pneumatic tire, as in the modification shown in Fig. 1.

In the event of the disabling of one of the tubes, the remaining tube serves to support the load upon the wheel, and even if all the tubes are disabled the inner tire 5 or 11 serves to support the load on the wheel until a convenient place is reached to repair or replace the disabled tubes. The replacement of a disabled tube is easily made, as described in connection with the assembling of the tire, and "spares" or extra tubes for replacement may be carried on the vehicle in a deflated condition, thus occupying but little space. By the use of the tire described herein, it is apparent that the inconvenient stopping for tire repairs on account of a single puncture or blowout, so prevalent with the use of the tires hitherto known, is avoided.

The term "cushion tire" as used in the claims is intended to describe a so-called solid tire having either no air spaces within its structure, or else no communicating air spaces and adapted to support the weight of the vehicle, this term distinguishing from the so-called pneumatic tire formed of a hollow elastic tubing with the communicating air space.

Attention is directed to the feature of the invention which permits the use of a pneumatic tire of relatively small cross section, thus decreasing the replacement cost, a factor of great importance in heavy duty automobiles and trucks. Emphasis is laid also on the utility of the complete tire as providing the advantages of pneumatic construction with the stability of the so-called cushion type tire, at the same time eliminating the operating cost of the all-pneumatic tire. Various other advantages as well as modifications of construction will be apparent to those skilled in the art to which the invention pertains and it is desired therefore that all phases and modifications of the invention be covered broadly as well as specifically as defined by the claims hereto appended.

I claim:—

1. In combination, a cushion tire having a groove of substantially semicircular cross section in its periphery, and a pneumatic tire positioned and secured in said groove.

2. In combination, a cushion tire having an annular groove of substantially semicircular cross section in its periphery, a pneumatic tire arranged in said groove, and coacting means on said cushion and pneumatic tires to prevent relative movement thereof.

3. In combination, a cushion tire having an annular groove of substantially semicircular cross section in its periphery, a channel at the bottom of said groove, a pneumatic tire arranged in said groove and a member on said pneumatic tire projecting into said channel.

4. In combination, a cushion tire having air spaces in it and provided with an annular groove in its periphery, and a pneumatic tire positioned in said groove.

5. In combination, a cushion tire having air spaces in it and provided with an annular groove of substantially semicircular cross section in its periphery, a pneumatic tire arranged in said groove, and coacting means on said cushion and pneumatic tires to prevent relative movement thereof.

6. In combination, a cushion tire having air spaces in it and provided with an annular groove of substantially semicircular cross section in its periphery, a channel at the bottom of said groove, a pneumatic tire arranged in said groove, a member on said pneumatic tire projecting into said channel, and coacting means in said channel and on said member to prevent relative rotation of said tires said means including a plurality of projecting ridges on said member and on said channel extending toward and engaged by each other.

7. In combination, a cushion tire having a plurality of annular grooves of substantially semicircular cross section in its periphery and co-acting pneumatic tires arranged in said grooves.

8. In combination, a cushion tire having a plurality of annular grooves in its periphery and pneumatic tires positioned in said grooves.

9. In a tire construction, the combination of a cushion tire, a pneumatic tire mounted circumferentially on said cushion tire, both of said tires having a bearing surface adapted to contact with the road surface, said cushion tire being adapted for use when said pneumatic tire is deflated.

JOHN ALLEN HEANY.